US012812409B2

(12) United States Patent
Taft et al.

(10) Patent No.: US 12,812,409 B2
(45) Date of Patent: Nov. 24, 2026

(54) SYSTEMS AND METHODS FOR PROVIDING A NETWORK SLICE BASED SERVICE AREA VIA SELF-ORGANIZING NETWORKS

(71) Applicant: Verizon Patent and Licensing Inc., Basking Ridge, NJ (US)

(72) Inventors: David Taft, Keller, TX (US); Jerry Steben, Fort Worth, TX (US); Lap Tse, Marietta, GA (US); Maqbool Chauhan, Keller, TX (US); Sudhakar Reddy Patil, Flower Mound, TX (US); Mark T. Watts, Newport, RI (US); Maria G. Lam, Irvine, CA (US); Scott E. Haskell, Burlington, NJ (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 328 days.

(21) Appl. No.: 18/335,945

(22) Filed: Jun. 15, 2023

(65) Prior Publication Data

US 2024/0422578 A1 Dec. 19, 2024

(51) Int. Cl.
*H04W 24/02* (2009.01)
*H04W 28/24* (2009.01)
*H04W 84/18* (2009.01)

(52) U.S. Cl.
CPC .......... *H04W 24/02* (2013.01); *H04W 28/24* (2013.01); *H04W 84/18* (2013.01)

(58) Field of Classification Search
CPC . H04L 41/50; H04L 41/5009; H04L 41/5051; H04W 28/16; H04W 28/18; H04W 28/24; H04W 28/26
See application file for complete search history.

(56) References Cited

U.S. PATENT DOCUMENTS

2015/0081907 A1* 3/2015 Scharf .................... H04L 67/10 709/226
2020/0154280 A1* 5/2020 Deviprasad ............ H04L 41/04
2021/0014737 A1* 1/2021 Yang .................... H04W 76/11
(Continued)

OTHER PUBLICATIONS

X. Li, R. Ni, J. Chen, Y. Lyu, Z. Rong and R. Du, "End-to-End Network Slicing in Radio Access Network, Transport Network and Core Network Domains," in IEEE Access, vol. 8, pp. 29525-29537, 2020, doi: 10.1109/ACCESS.2020.2972105. (Year: 2020).*

*Primary Examiner* — Kevin T Bates

(57) ABSTRACT

A device may receive performance requirements for a service, and may receive RAN factors that influence a RAN, core factors that influence a core network, and transport factors that influence a transport network. The device may determine a RAN capability to satisfy the performance requirements, and may determine a core capability to satisfy the performance requirements. The device may determine a transport capability to satisfy the performance requirements, and may determine RAN configuration settings, core configuration settings, and transport configuration settings based on the RAN capability, the core capability, and the transport capability, respectively. The device may generate a RAN SON based on the RAN configuration settings, a core SON based on the core configuration settings, and a transport SON based on the transport configuration settings. The device may create a network slice based service area based on the RAN SON, the core SON, and the transport SON.

20 Claims, 8 Drawing Sheets

(56) References Cited

U.S. PATENT DOCUMENTS

| | | | | |
|---|---|---|---|---|
| 2021/0144061 | A1* | 5/2021 | Agarwal | H04L 41/0806 |
| 2021/0320850 | A1* | 10/2021 | Young | H04L 41/5012 |
| 2021/0368514 | A1* | 11/2021 | Xing | H04L 41/0896 |
| 2022/0103653 | A1* | 3/2022 | Sorrentino | G06F 9/5072 |
| 2022/0141738 | A1* | 5/2022 | Chou | H04W 36/00837<br>455/437 |
| 2023/0140659 | A1* | 5/2023 | Zhang | H04L 41/0894<br>370/252 |

* cited by examiner

SYSTEMS AND METHODS FOR PROVIDING A NETWORK SLICE BASED SERVICE AREA VIA SELF-ORGANIZING NETWORKS

BACKGROUND

Network slicing is an end-to-end capability that provides different fifth generation (5G) core network services with different quality of service (QOS) to user devices. A self-organizing network (SON) is an automation technology designed to make planning, configuration, management, optimization, and healing of a network simpler and faster.

DETAILED DESCRIPTION OF EXAMPLE EMBODIMENTS

Figure 1A:
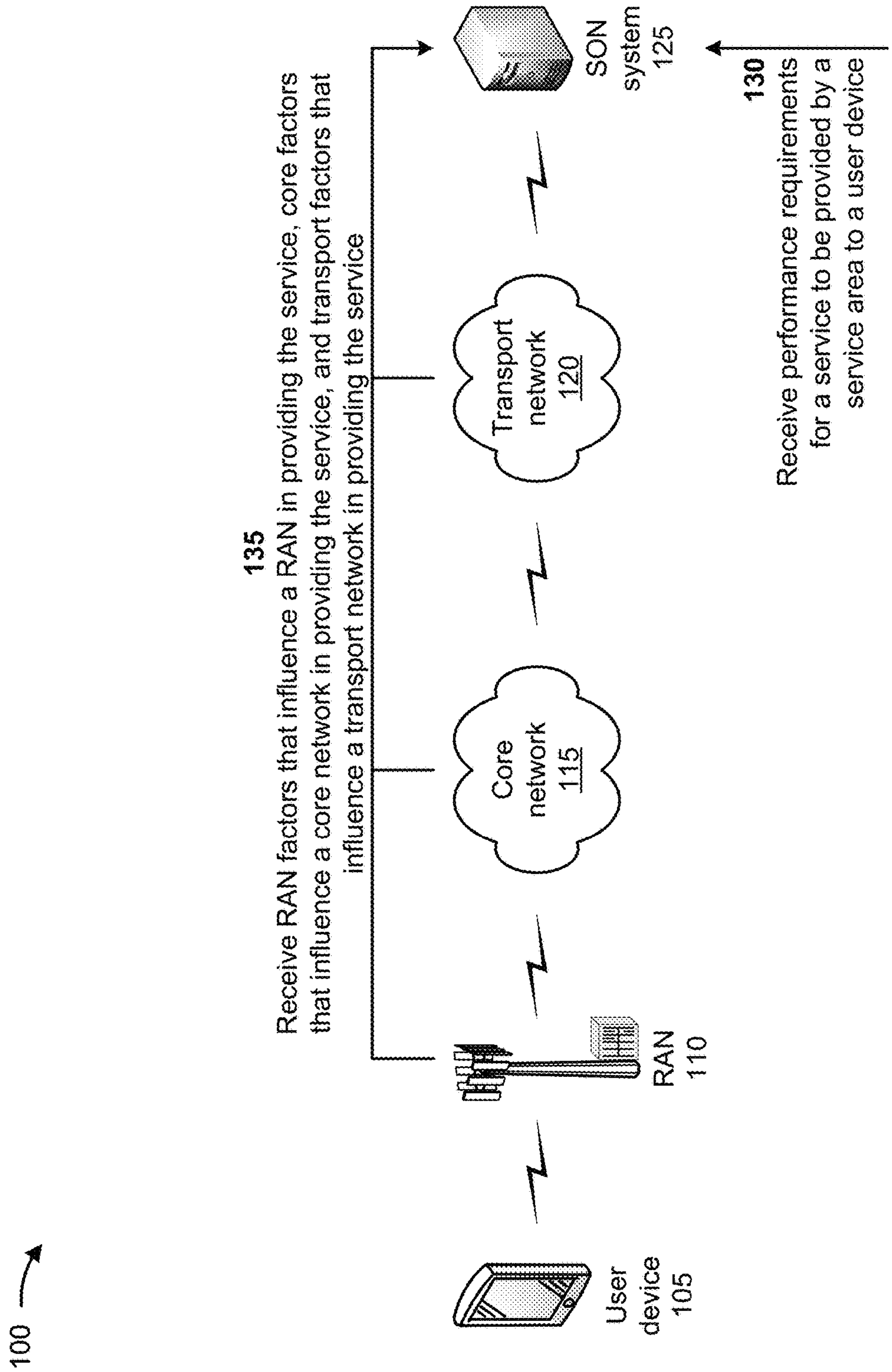
FIGS. 1A-1E are diagrams of an example associated with providing a network slice based service area via self-organizing networks (SONs).

The following detailed description of example implementations refers to the accompanying drawings. The same reference numbers in different drawings may identify the same or similar elements.

A service provider's radio access network (RAN), transport network, and core network environment may introduce scenarios that result in coverage area and service area differences (e.g., at a cell edge, in a building, optical distance limitations, and/or the like). The coverage area and service area differences may be expanded to include several operator-specific variables, such as transport network factors (e.g., distance limitations for optical fibers) and core network factors (e.g., a location of a user plane function). Therefore, the service provider's environment may be unable to provide a service that satisfies traffic characteristics and/or performance requirements. Thus, current mechanisms for providing a service in a RAN, transport network, and core network environment consume computing resources (e.g., processing resources, memory resources, communication resources, and/or the like), networking resources, and/or other resources associated with failing to provide a service that satisfies traffic characteristics and/or performance requirements (e.g., QoS requirements), providing poor user experiences for users of user devices attempting to access or accessing the service, handling lost traffic for user devices attempting to access or accessing the service, attempting to recover the lost traffic, and/or the like.

Some implementations described herein provide a SON system that provides a network slice based service area via SONs. For example, the SON system may receive performance requirements for a service to be provided by a service area to a user device, and may receive RAN factors that influence a RAN in providing the service, core factors that influence a core network in providing the service, and transport factors that influence a transport network in providing the service. The SON system may determine, based on the RAN factors, a RAN capability of the RAN to satisfy the performance requirements, and may determine, based on the core factors, a core capability of the core network to satisfy the performance requirements. The SON system may determine, based on the transport factors, a transport capability of the transport network to satisfy the performance requirements, and may determine RAN configuration settings based on the RAN capability, core configuration settings based on the core capability, and transport configuration settings based on the transport capability. The SON system may generate a RAN SON for the service area based on the RAN configuration settings, and may generate a core SON for the service area based on the core configuration settings. The SON system may generate a transport SON for the service area based on the transport configuration settings, and may receive a request for the service from the user device. The SON system may provide the service to the user device via a network slice based service area provided by the RAN SON, the core SON, and the transport SON.

In this way, the SON system provides a network slice based service area via SONs. For example, the SON system may establish a service area that satisfies specific traffic characteristics for a service, and may associate the service area with a network slice based service area. The SON system may generate the network slice based service area based on determining factors associated with a RAN, a core network, and a transport network. The network slice based service area may address each of the domains (e.g., the RAN, the core network, and the transport network) to achieve an improved user experience (e.g., higher quality video, lower latency services, and/or the like) for a user device. Thus, the SON system may conserve computing resources, networking resources, and/or other resources that would otherwise have been consumed by failing to provide a service that satisfies traffic characteristics and/or performance requirements (e.g., QoS requirements), providing poor user experiences for user devices attempting to access or accessing the service, handling lost traffic for user devices attempting to access or accessing the service, attempting to recover the lost traffic, and/or the like.

FIGS. 1A-1E are diagrams of an example 100 associated with providing a network slice based service area via SONs. As shown in FIGS. 1A-1E, example 100 includes a user device 105, a radio access network (RAN) 110, a core network 115, a transport network 120, and a SON system 125. Further details of the user device 105, the RAN 110, the core network 115, the transport network 120, and the SON system 125 are provided elsewhere herein. Although only one user device 105 is depicted in FIG. 1A, in some implementations more than one user device 105 may be associated with the RAN 110, the core network 115, and the transport network 120.

As further shown in FIG. 1A, and by reference number 130, the SON system 125 may receive performance requirements for a service to be provided by a service area to the user device 105. For example, a service may be provided by the RAN 110, the core network 115, and the transport network 120, such as streaming video, video conferencing, a gaming service, and/or the like. The service may be provided to the user device 105 and may require particular performance requirements. The SON system 125 may receive the performance requirements for the service from a service provider via a service level agreement (SLA), a service level objective (SLO), traffic characteristics for the service, and/or the like. In some implementations, the performance requirements may include requirements associated with an electrical interface, a form factor, a data rate, an optical connection, a fiber type, a wavelength, a distance, a modulation, a signal-to-noise ratio (SNR), equipment loading, spectrum availability, a modulation, spectrum loading, a user plane function (UPF) location, a multi-access edge computing (MEC) device location, an aggregate maximum bit rate, a quality of service (QOS) identifier, a guaranteed or non-guaranteed bit rate, and/or the like. In some implementations, the SON system 125 may continuously receive the performance requirements, may periodically receive the performance requirements, may receive the performance requirements based on requesting the performance requirements, and/or the like.

As further shown in FIG. 1A, and by reference number 135, the SON system 125 may receive RAN factors that influence the RAN 110 in providing the service, core factors that influence the core network 115 in providing the service, and transport factors that influence the transport network 120 in providing the service. For example, the SON system 125 may receive, from the RAN 110, the RAN factors that influence the RAN 110 in providing the service. In some implementations, the RAN factors may include factors associated with an electrical interface of the RAN 110, a form factor of the RAN 110, a data rate of the RAN 110, an optical connection of the RAN 110, a fiber type of the RAN 110, a wavelength of the RAN 110, a distance associated with the RAN 110, a modulation of the RAN 110, an SNR of the RAN 110, equipment loading of the RAN 110, spectrum availability of the RAN 110, spectrum loading of the RAN 110, a QoS identifier of the RAN 110, and/or the like.

The SON system 125 may receive, from the core network 115, the core factors that influence the core network 115 in providing the service. In some implementations, the core factors may include factors associated with an electrical interface of the core network 115, a form factor of the core network 115, a data rate of the core network 115, an optical connection of the core network 115, a fiber type of the core network 115, a wavelength of the core network 115, a distance associated with the core network 115, a modulation of the core network 115, an SNR of the core network 115, equipment loading of the core network 115, spectrum availability of the core network 115, spectrum loading of the core network 115, a UPF location of the core network 115, an MEC location, an aggregate maximum bit rate of the core network 115, a QoS identifier of the core network 115, a guaranteed or non-guaranteed bit rate of the core network 115, and/or the like. In some implementations, the SON system 125 may continuously receive the core factors from the core network 115, may periodically receive the core factors from the core network 115, may receive the core factors from the core network 115 based on requesting the core factors from the core network 115, and/or the like.

The SON system 125 may receive, from the transport network 120, the transport factors that influence the transport network 120 in providing the service. In some implementations, the transport factors may include factors associated with an electrical interface of the transport network 120, a form factor of the transport network 120, a data rate of the transport network 120, an optical connection of the transport network 120, a fiber type of the transport network 120, a wavelength of the transport network 120, a distance associated with the transport network 120, a modulation of the transport network 120, equipment loading of the transport network 120, spectrum availability of the transport network 120, spectrum loading of the transport network 120, and/or the like. In some implementations, the SON system 125 may continuously receive the transport factors from the transport network 120, may periodically receive the transport factors from the transport network 120, may receive the transport factors from the transport network 120 based on requesting the transport factors from the transport network 120, and/or the like.

Figure 1B:
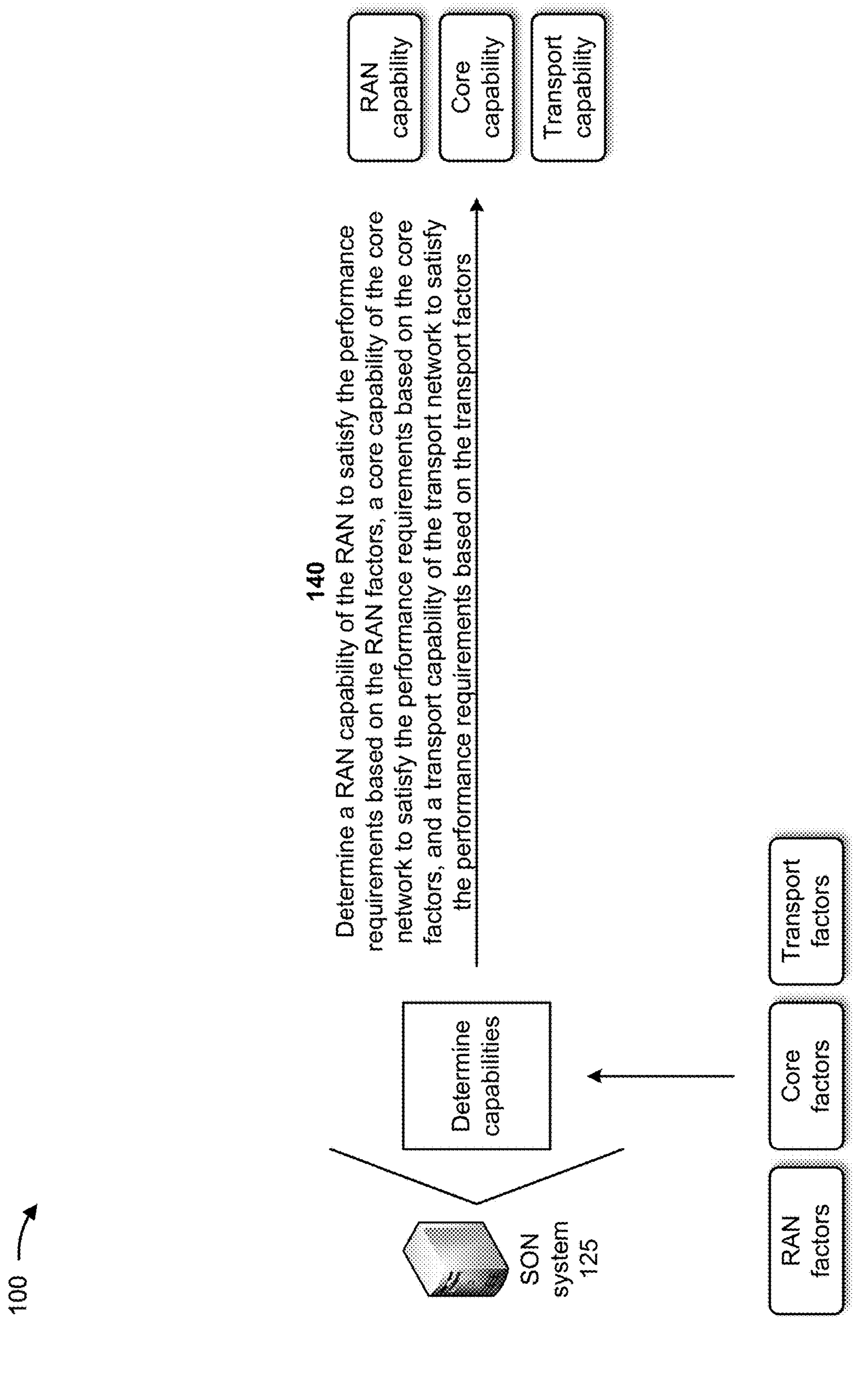

As shown in FIG. 1B, and by reference number 140, the SON system 125 may determine a RAN capability of the RAN 110 to satisfy the performance requirements based on the RAN factors, a core capability of the core network 115 to satisfy the performance requirements based on the core factors, and a transport capability of the transport network 120 to satisfy the performance requirements based on the transport factors. For example, when determining, based on the RAN factors, the RAN capability of the RAN 110 to satisfy the performance requirements, the SON system 125 may determine whether one or more of the RAN factors satisfy the performance requirements. The SON system 125 may determine the RAN capability based on determining whether one or more of the RAN factors satisfy the performance requirements. In one example, the SON system 125 may determine whether the electrical interface of the RAN 110 satisfies the performance requirement for the electrical interface, may determine whether the form factor of the RAN 110 satisfies the performance requirement for the form factor, and/or the like. In some implementations, one or more of the RAN factors may fail to satisfy the performance requirements, and the SON system 125 may utilize best efforts to partially satisfy the performance requirements for the one or more RAN factors that fail to satisfy the performance requirements.

In some implementations, when determining, based on the core factors, the core capability of the core network 115 to satisfy the performance requirements, the SON system 125 may determine whether one or more of the core factors satisfy the performance requirements. The SON system 125 may determine the core capability based on determining whether one or more of the core factors satisfy the performance requirements. In one example, the SON system 125 may determine whether the electrical interface of the core network 115 satisfies the performance requirement for the electrical interface, may determine whether the form factor of the core network 115 satisfies the performance requirement for the form factor, and/or the like. In some implementations, one or more of the core factors may fail to satisfy the performance requirements, and the SON system 125 may utilize best efforts to partially satisfy the performance requirements for the one or more core factors that fail to satisfy the performance requirements.

In some implementations, when determining, based on the transport factors, the transport capability of the transport network 120 to satisfy the performance requirements, the SON system 125 may determine whether one or more of the transport factors satisfy the performance requirements. The SON system 125 may determine the transport capability based on determining whether one or more of the transport factors satisfy the performance requirements. In one example, the SON system 125 may determine whether the electrical interface of the transport network 120 satisfies the performance requirement for the electrical interface, may determine whether the form factor of the transport network 120 satisfies the performance requirement for the form factor, and/or the like. In some implementations, one or more of the transport factors may fail to satisfy the performance requirements, and the SON system 125 may utilize best efforts to partially satisfy the performance requirements for the one or more transport factors that fail to satisfy the performance requirements.

Figure 1C:
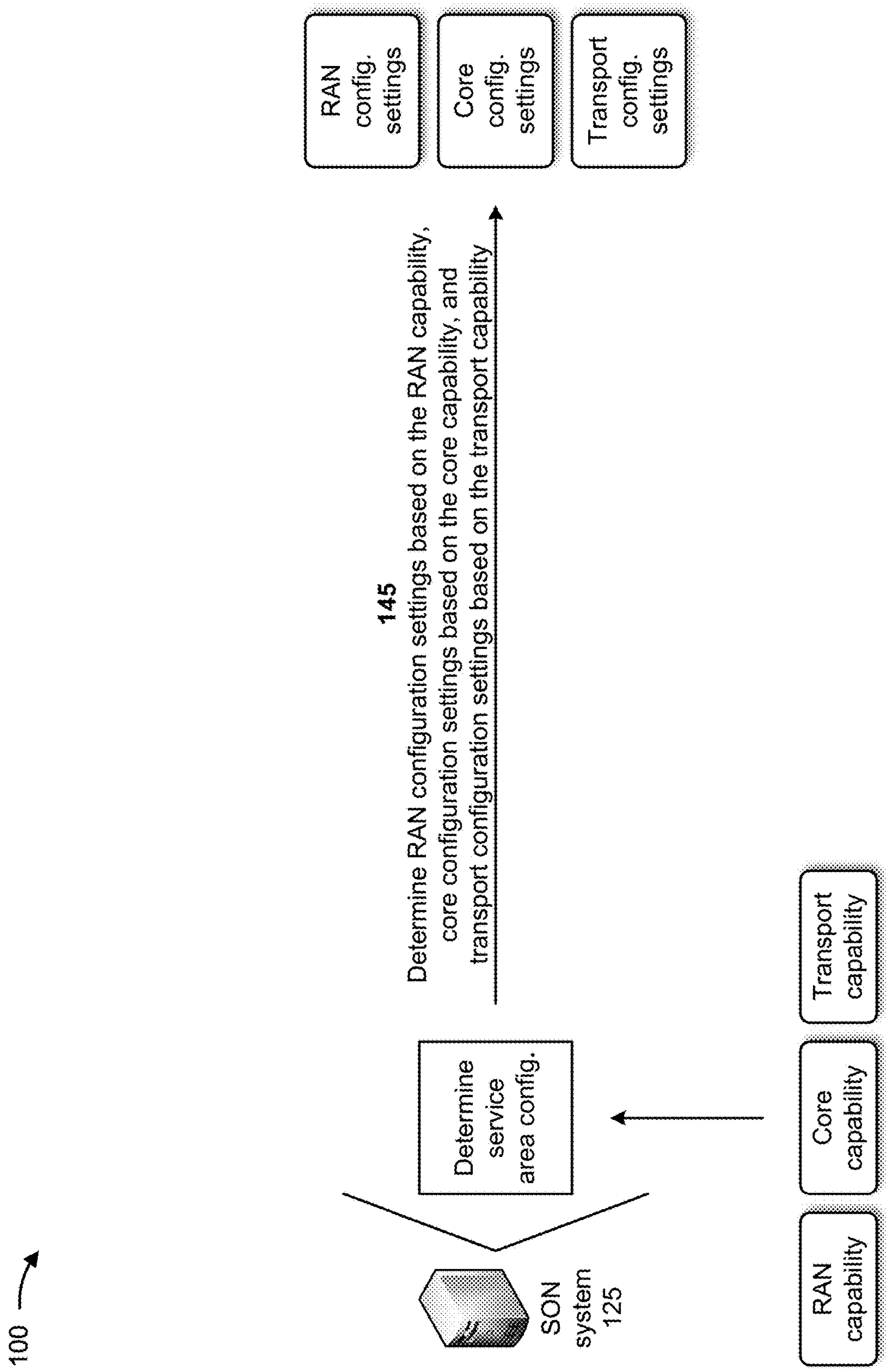

As shown in FIG. 1C, and by reference number 145, the SON system 125 may determine RAN configuration settings based on the RAN capability, core configuration settings based on the core capability, and transport configuration settings based on the transport capability. For example, the SON system 125 may utilize the RAN capability to determine the RAN configuration settings by setting, as the RAN configuration settings, the one or more RAN factors that satisfy the performance requirements. In some implementations, the SON system 125 may set, as the RAN configuration settings, the one or more RAN factors that fail to satisfy the performance requirements (e.g., using best efforts configuration settings). The SON system 125 may utilize the core capability to determine the core configuration settings by setting, as the core configuration settings, the one or more core factors that satisfy the performance requirements. In some implementations, the SON system 125 may set, as the core configuration settings, the one or more core factors that fail to satisfy the performance requirements (e.g., using best efforts configuration settings). The SON system 125 may utilize the transport capability to determine the transport configuration settings by setting, as the transport configuration settings, the one or more transport factors that satisfy the performance requirements. In some implementations, the SON system 125 may set, as the transport configuration settings, the one or more transport factors that fail to satisfy the performance requirements (e.g., using best efforts configuration settings).

Figure 1D:
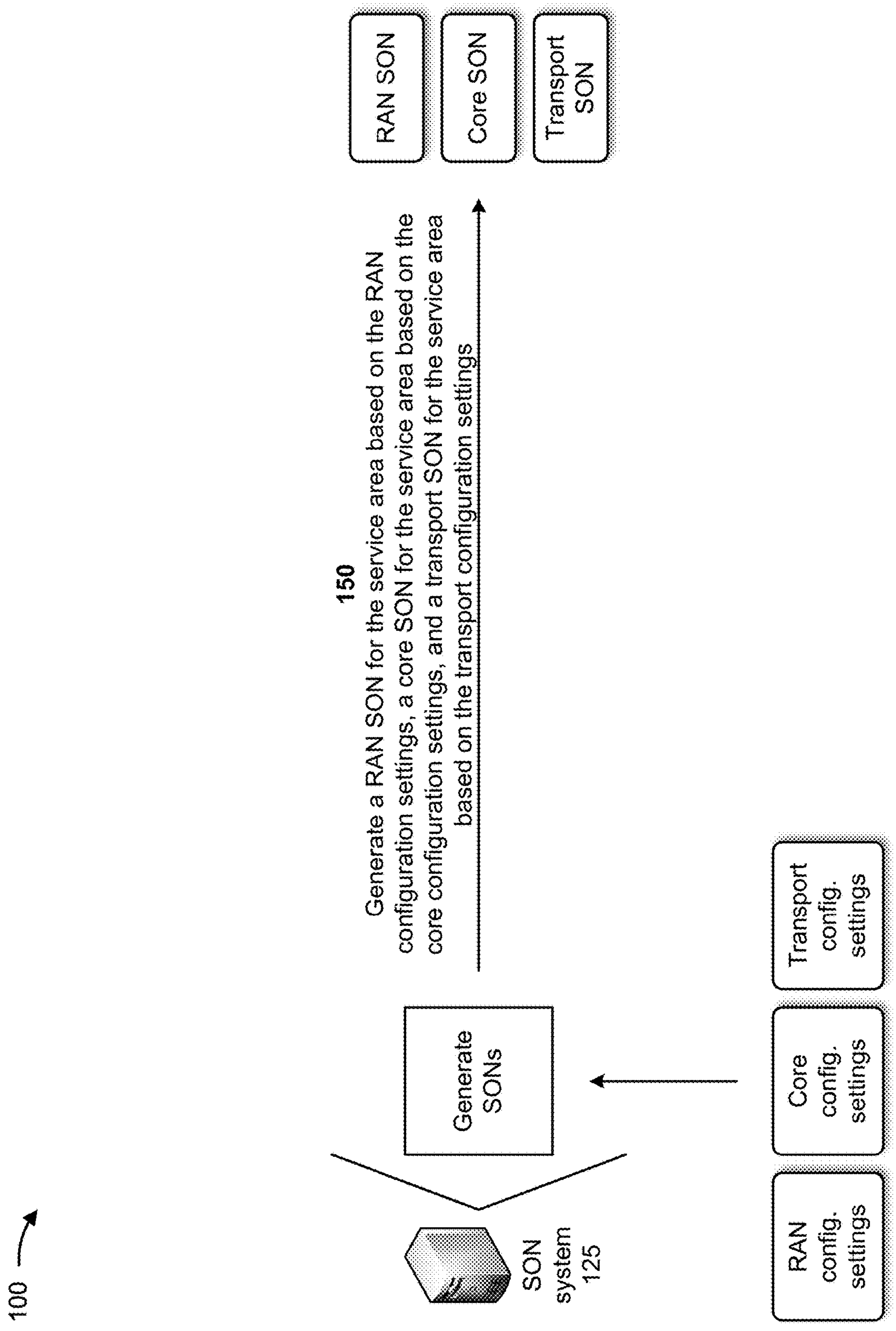

As shown in FIG. 1D, and by reference number 150, the SON system 125 may generate a RAN SON for the service area based on the RAN configuration settings, a core SON for the service area based on the core configuration settings, and a transport SON for the service area based on the transport configuration settings. For example, the SON system 125 may utilize the RAN configuration settings to generate and configure the RAN SON (e.g., via one or more network functions). The RAN configuration settings may configure the RAN SON to provide the service in manner similar to the RAN 110 but in accordance with the RAN factors and the performance requirements for the RAN 110. In this way, the RAN SON may provide an improved user experience for the service compared to a user experience provided by the RAN 110 for the service.

The SON system 125 may utilize the core configuration settings to generate and configure the core SON (e.g., via one or more network functions). The core configuration settings may configure the core SON to provide the service in manner similar to the core network 115 but in accordance with the core factors and the performance requirements for the core network 115. In this way, the core SON may provide an improved user experience for the service compared to a user experience provided by the core network 115 for the service.

The SON system 125 may utilize the transport configuration settings to generate and configure the transport SON (e.g., via one or more network functions). The transport configuration settings may configure the transport SON to provide the service in manner similar to the transport network 120 but in accordance with the transport factors and the performance requirements for the transport network 120. In this way, the transport SON may provide an improved user experience for the service compared to a user experience provided by the transport network 120 for the service.

Figure 1E:
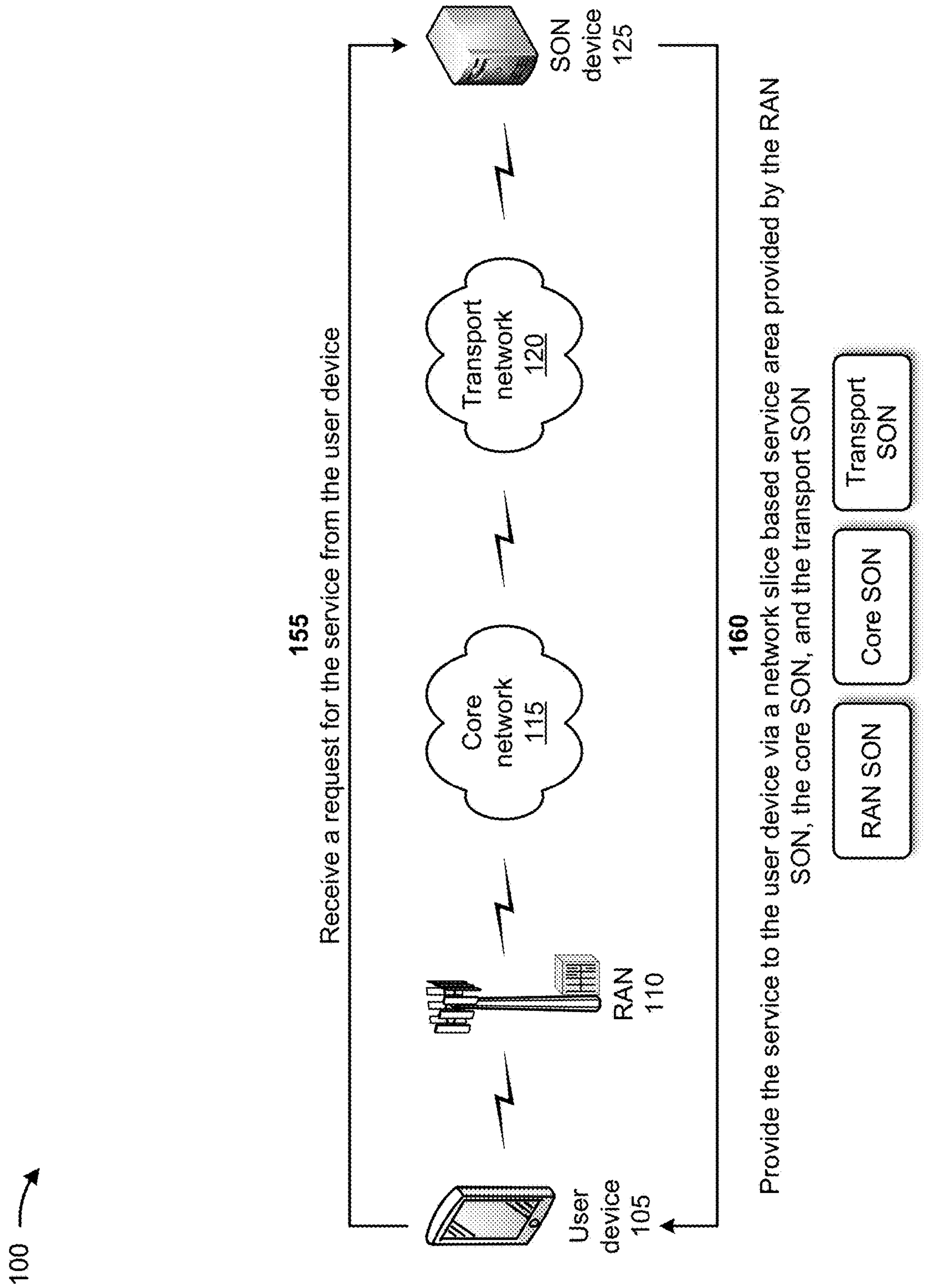

As shown in FIG. 1E, and by reference number 155, the SON system 125 may receive a request for the service from the user device 105. For example, a user of the user device 105 may cause the user device 105 to generate the request for the service. The user device 105 may provide the request for the service to the service provider's environment (e.g., the RAN 110, the core network 115, and the transport network 120). However, the service provider's environment may be unable to satisfy traffic characteristics and/or performance requirements of the service. Thus, the request for the service may be provided to the SON system 125, and the SON system 125 may receive the request for the service.

As further shown in FIG. 1E, and by reference number 160, the SON system 125 may provide the service to the user device 105 via a network slice based service area provided by the RAN SON, the core SON, and the transport SON. For example, when the SON system 125 receives the request for the service, the SON system 125 may generate a network slice based service area that includes the RAN SON, the core SON, and the transport SON. The network slice based service area (e.g., the RAN SON, the core SON, and the transport SON) may provide the service to the user device 105. In some implementations, the RAN SON, the core SON, and the transport SON may satisfy traffic characteristics and/or performance requirements of the service when providing the service to the user device 105.

In this way, the SON system 125 provides a network slice based service area via SONs. For example, the SON system 125 may establish a service area that satisfies specific traffic characteristics for a service, and may associate the service area with a network slice based service area. The SON system 125 may generate the network slice based service area based on determining factors associated with a RAN 110, a core network 115, and a transport network 120. The network slice based service area may address each of the domains (e.g., the RAN 110, the core network 115, and the transport network 120) to achieve an improved user experience (e.g., higher quality video, lower latency services, and/or the like) for a user device 105. Thus, the SON system 125 may conserve computing resources, networking resources, and/or other resources that would otherwise have been consumed by failing to provide a service that satisfies traffic characteristics and/or performance requirements (e.g., QoS requirements), providing poor user experiences for user devices 105 attempting to access or accessing the service, handling lost traffic for user devices 105 attempting to access or accessing the service, attempting to recover the lost traffic, and/or the like.

As indicated above, FIGS. 1A-1E are provided as an example. Other examples may differ from what is described with regard to FIGS. 1A-1E. The number and arrangement of devices shown in FIGS. 1A-1E are provided as an example. In practice, there may be additional devices, fewer devices, different devices, or differently arranged devices than those shown in FIGS. 1A-1E. Furthermore, two or more devices shown in FIGS. 1A-1E may be implemented within a single device, or a single device shown in FIGS. 1A-1E may be implemented as multiple, distributed devices. Additionally, or alternatively, a set of devices (e.g., one or more devices) shown in FIGS. 1A-1E may perform one or more functions described as being performed by another set of devices shown in FIGS. 1A-1E.

Figure 2:
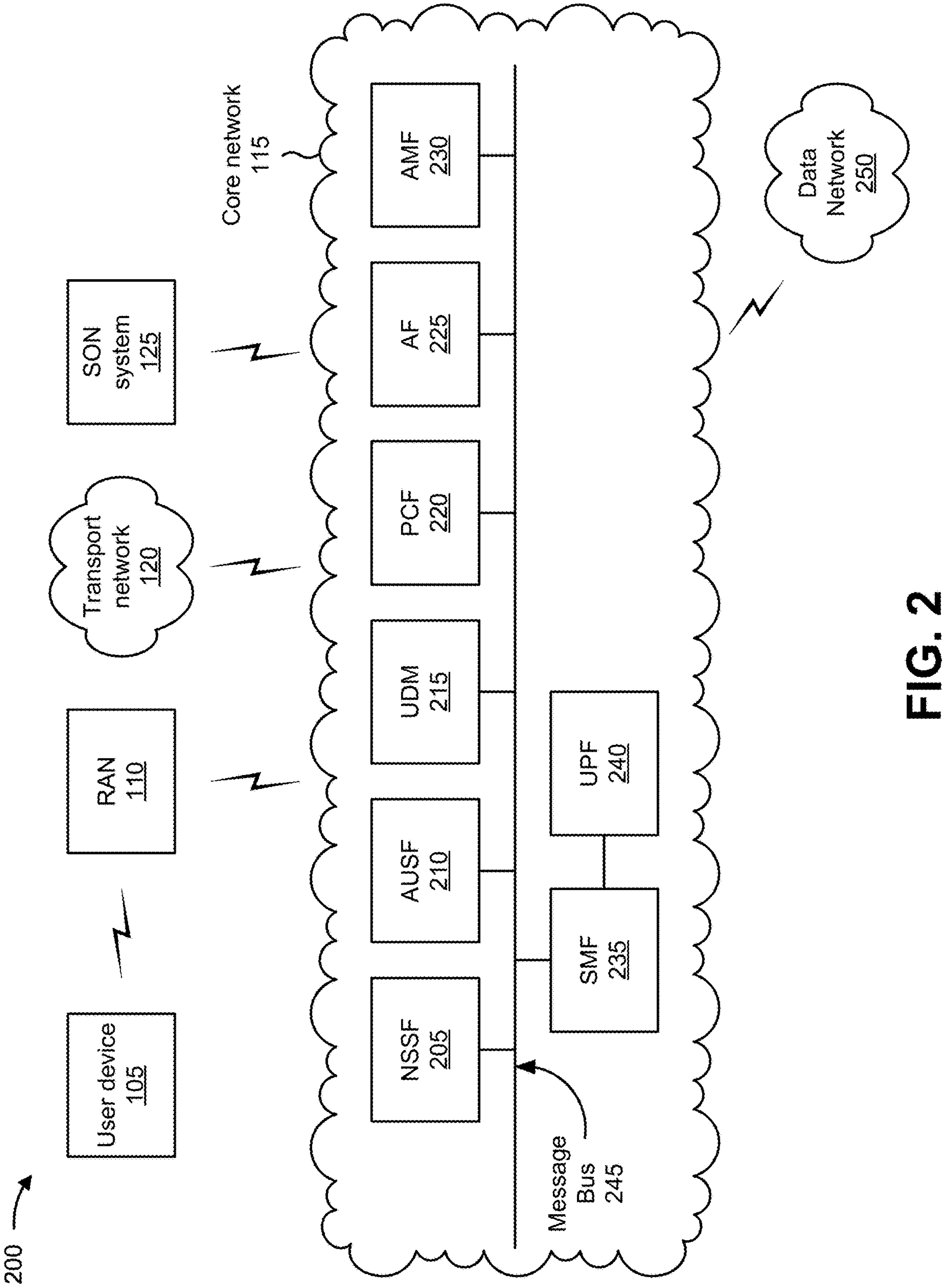
FIG. 2 is a diagram of an example environment in which systems and/or methods described herein may be implemented.

FIG. 2 is a diagram of an example environment 200 in which systems and/or methods described herein may be implemented. As shown in FIG. 2, the example environment 200 may include the user device 105, the RAN 110, the core network 115, the transport network 120, the SON system 125, and a data network 250. Devices and/or networks of the example environment 200 may interconnect via wired connections, wireless connections, or a combination of wired and wireless connections.

The user device 105 may include one or more devices capable of receiving, generating, storing, processing, and/or providing information, as described elsewhere herein. The user device 105 may include a communication device and/or a computing device. For example, the user device 105 may include a wireless communication device, a mobile phone, a user equipment, a laptop computer, a tablet computer, a desktop computer, a gaming console, a set-top box, a wearable communication device (e.g., a smart wristwatch, a pair of smart eyeglasses, a head mounted display, or a virtual reality headset), or a similar type of device.

The RAN 110 may support, for example, a cellular radio access technology (RAT). The RAN 110 may include one or more base stations (e.g., base transceiver stations, radio base stations, node Bs, eNodeBs (eNBs), gNodeBs (gNBs), base station subsystems, cellular sites, cellular towers, access points, transmit receive points (TRPs), radio access nodes, macrocell base stations, microcell base stations, picocell base stations, femtocell base stations, or similar types of devices) and other network entities that can support wireless communication for the user device 105. The RAN 110 may transfer traffic between the user device 105 (e.g., using a cellular RAT), one or more base stations (e.g., using a wireless interface or a backhaul interface, such as a wired backhaul interface), and/or the core network 115. The RAN 110 may provide one or more cells that cover geographic areas.

In some implementations, the RAN 110 may perform scheduling and/or resource management for the user device 105 covered by the RAN 110 (e.g., the user device 105 covered by a cell provided by the RAN 110). In some implementations, the RAN 110 may be controlled or coordinated by a network controller, which may perform load balancing, network-level configuration, and/or other operations. The network controller may communicate with the RAN 110 via a wireless or wireline backhaul. In some implementations, the RAN 110 may include a network controller, a self-organizing network (SON) module or component, or a similar module or component. In other words, the RAN 110 may perform network control, scheduling, and/or network management functions (e.g., for uplink, downlink, and/or sidelink communications of the user device 105 covered by the RAN 110).

The transport network 120 may include one or more wired and/or wireless networks. For example, the transport network 120 may include an optical transport network that physically connects the devices of the environment 200 via fiber optic cables, and wireline, wireless, and backbone networks of the environment 200. The transport network 120 may guarantee logical connection and may control the flow of data between the devices and/or the networks of the environment 200. The transport network 120 enables communication among the devices and/or the networks of the environment 200.

The SON system 125 may include one or more devices capable of receiving, generating, storing, processing, providing, and/or routing information, as described elsewhere herein. The SON system 125 may include a communication device and/or a computing device. For example, the SON system 125 may include a server, such as an application server, a client server, a web server, a database server, a host server, a proxy server, a virtual server (e.g., executing on computing hardware), or a server in a cloud computing system. In some implementations, the SON system 125 may include computing hardware used in a cloud computing environment.

In some implementations, the core network 115 may include an example functional architecture in which systems and/or methods described herein may be implemented. For example, the core network 115 may include an example architecture of a 5G next generation (NG) core network included in a 5G wireless telecommunications system. While the example architecture of the core network 115 shown in FIG. 2 may be an example of a service-based architecture, in some implementations, the core network 115 may be implemented as a reference-point architecture and/or a 4G core network, among other examples.

As shown in FIG. 2, the core network 115 may include a number of functional elements. The functional elements may include, for example, a network slice selection function (NSSF) 205, an authentication server function (AUSF) 210, a unified data management (UDM) component 215, a policy control function (PCF) 220, an application function (AF) 225, an access and mobility management function (AMF) 230, a session management function (SMF) 235, and/or a user plane function (UPF) 240. These functional elements may be communicatively connected via a message bus 245. Each of the functional elements shown in FIG. 2 is implemented on one or more devices associated with a wireless telecommunications system. In some implementations, one or more of the functional elements may be implemented on physical devices, such as an access point, a base station, and/or a gateway. In some implementations, one or more of the functional elements may be implemented on a computing device of a cloud computing environment.

The NSSF 205 includes one or more devices that select network slice instances for the user device 105. By providing network slicing, the NSSF 205 allows an operator to deploy multiple substantially independent end-to-end networks potentially with the same infrastructure. In some implementations, each slice may be customized for different services.

The AUSF 210 includes one or more devices that act as an authentication server and support the process of authenticating the user device 105 in the wireless telecommunications system.

The UDM 215 includes one or more devices that store user data and profiles in the wireless telecommunications system. The UDM 215 may be used for fixed access and/or mobile access in the core network 115.

The PCF 220 includes one or more devices that provide a policy framework that incorporates network slicing, roaming, packet processing, and/or mobility management, among other examples.

The AF 225 includes one or more devices that support application influence on traffic routing, access to a network exposure function, and/or policy control, among other examples.

The AMF 230 includes one or more devices that act as a termination point for non-access stratum (NAS) signaling and/or mobility management, among other examples.

The SMF 235 includes one or more devices that support the establishment, modification, and release of communication sessions in the wireless telecommunications system. For example, the SMF 235 may configure traffic steering policies at the UPF 240 and/or may enforce user equipment Internet protocol (IP) address allocation and policies, among other examples.

The UPF 240 includes one or more devices that serve as an anchor point for intraRAT and/or interRAT mobility. The UPF 240 may apply rules to packets, such as rules pertaining to packet routing, traffic reporting, and/or handling user plane QoS, among other examples.

The message bus 245 represents a communication structure for communication among the functional elements. In other words, the message bus 245 may permit communication between two or more functional elements.

The data network 250 includes one or more wired and/or wireless data networks. For example, the data network 250 may include an Internet protocol multimedia subsystem (IMS) network, a public land mobile network (PLMN), a local area network (LAN), a wide area network (WAN), a metropolitan area network (MAN), a private network such as a corporate intranet, an ad hoc network, the Internet, a fiber optic-based network, a cloud computing network, a third party services network, an operator services network, and/or a combination of these or other types of networks.

The number and arrangement of devices and networks shown in FIG. 2 are provided as an example. In practice, there may be additional devices and/or networks, fewer devices and/or networks, different devices and/or networks, or differently arranged devices and/or networks than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of the example environment 200 may perform one or more functions described as being performed by another set of devices of the example environment 200.

Figure 3:
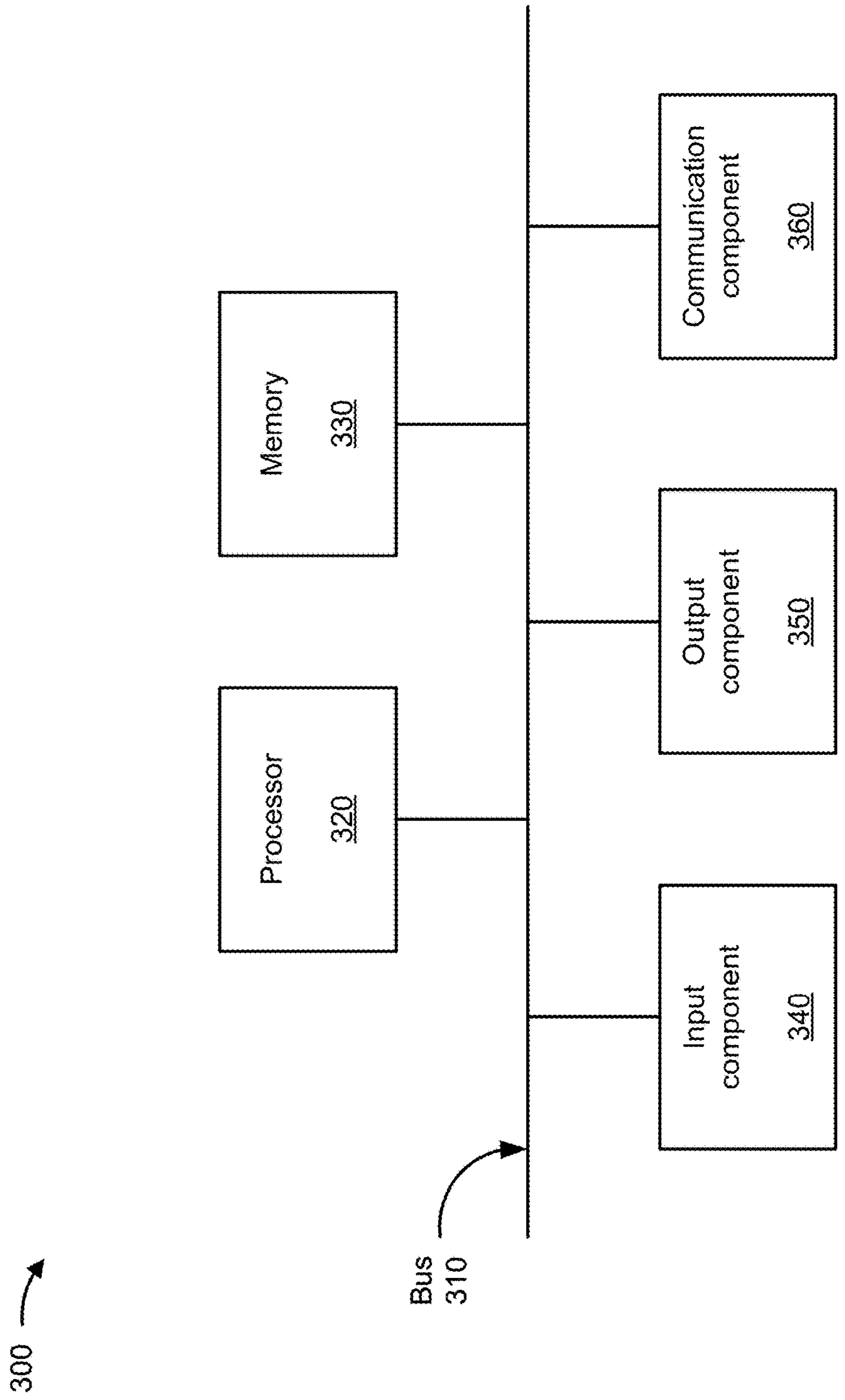
FIG. 3 is a diagram of example components of one or more devices of FIG. 2.

FIG. 3 is a diagram of example components of a device 300, which may correspond to the user device 105, the RAN 110, the SON system 125, the NSSF 205, the AUSF 210, the UDM 215, the PCF 220, the AF 225, the AMF 230, the SMF 235, and/or the UPF 240. In some implementations, the user device 105, the RAN 110, the SON system 125, the NSSF 205, the AUSF 210, the UDM 215, the PCF 220, the AF 225, the AMF 230, the SMF 235, and/or the UPF 240 may include one or more devices 300 and/or one or more components of the device 300. As shown in FIG. 3, the device 300 may include a bus 310, a processor 320, a memory 330, an input component 340, an output component 350, and a communication component 360.

The bus 310 includes one or more components that enable wired and/or wireless communication among the components of the device 300. The bus 310 may couple together two or more components of FIG. 3, such as via operative coupling, communicative coupling, electronic coupling, and/or electric coupling. The processor 320 includes a central processing unit, a graphics processing unit, a microprocessor, a controller, a microcontroller, a digital signal processor, a field-programmable gate array, an application-specific integrated circuit, and/or another type of processing component. The processor 320 is implemented in hardware, firmware, or a combination of hardware and software. In some implementations, the processor 320 includes one or more processors capable of being programmed to perform one or more operations or processes described elsewhere herein.

The memory 330 includes volatile and/or nonvolatile memory. For example, the memory 330 may include random access memory (RAM), read only memory (ROM), a hard disk drive, and/or another type of memory (e.g., a flash memory, a magnetic memory, and/or an optical memory). The memory 330 may include internal memory (e.g., RAM, ROM, or a hard disk drive) and/or removable memory (e.g., removable via a universal serial bus connection). The memory 330 may be a non-transitory computer-readable medium. Memory 330 stores information, instructions, and/or software (e.g., one or more software applications) related to the operation of the device 300. In some implementations, the memory 330 includes one or more memories that are coupled to one or more processors (e.g., the processor 320), such as via the bus 310.

The input component 340 enables the device 300 to receive input, such as user input and/or sensed input. For example, the input component 340 may include a touch screen, a keyboard, a keypad, a mouse, a button, a microphone, a switch, a sensor, a global positioning system sensor, an accelerometer, a gyroscope, and/or an actuator. The output component 350 enables the device 300 to provide output, such as via a display, a speaker, and/or a light-emitting diode. The communication component 360 enables the device 300 to communicate with other devices via a wired connection and/or a wireless connection. For example, the communication component 360 may include a receiver, a transmitter, a transceiver, a modem, a network interface card, and/or an antenna.

The device 300 may perform one or more operations or processes described herein. For example, a non-transitory computer-readable medium (e.g., the memory 330) may store a set of instructions (e.g., one or more instructions or code) for execution by the processor 320. The processor 320 may execute the set of instructions to perform one or more operations or processes described herein. In some implementations, execution of the set of instructions, by one or more processors 320, causes the one or more processors 320 and/or the device 300 to perform one or more operations or processes described herein. In some implementations, hardwired circuitry may be used instead of or in combination with the instructions to perform one or more operations or processes described herein. Additionally, or alternatively, the processor 320 may be configured to perform one or more operations or processes described herein. Thus, implementations described herein are not limited to any specific combination of hardware circuitry and software.

The number and arrangement of components shown in FIG. 3 are provided as an example. The device 300 may include additional components, fewer components, different components, or differently arranged components than those shown in FIG. 3. Additionally, or alternatively, a set of components (e.g., one or more components) of the device 300 may perform one or more functions described as being performed by another set of components of the device 300.

Figure 4:
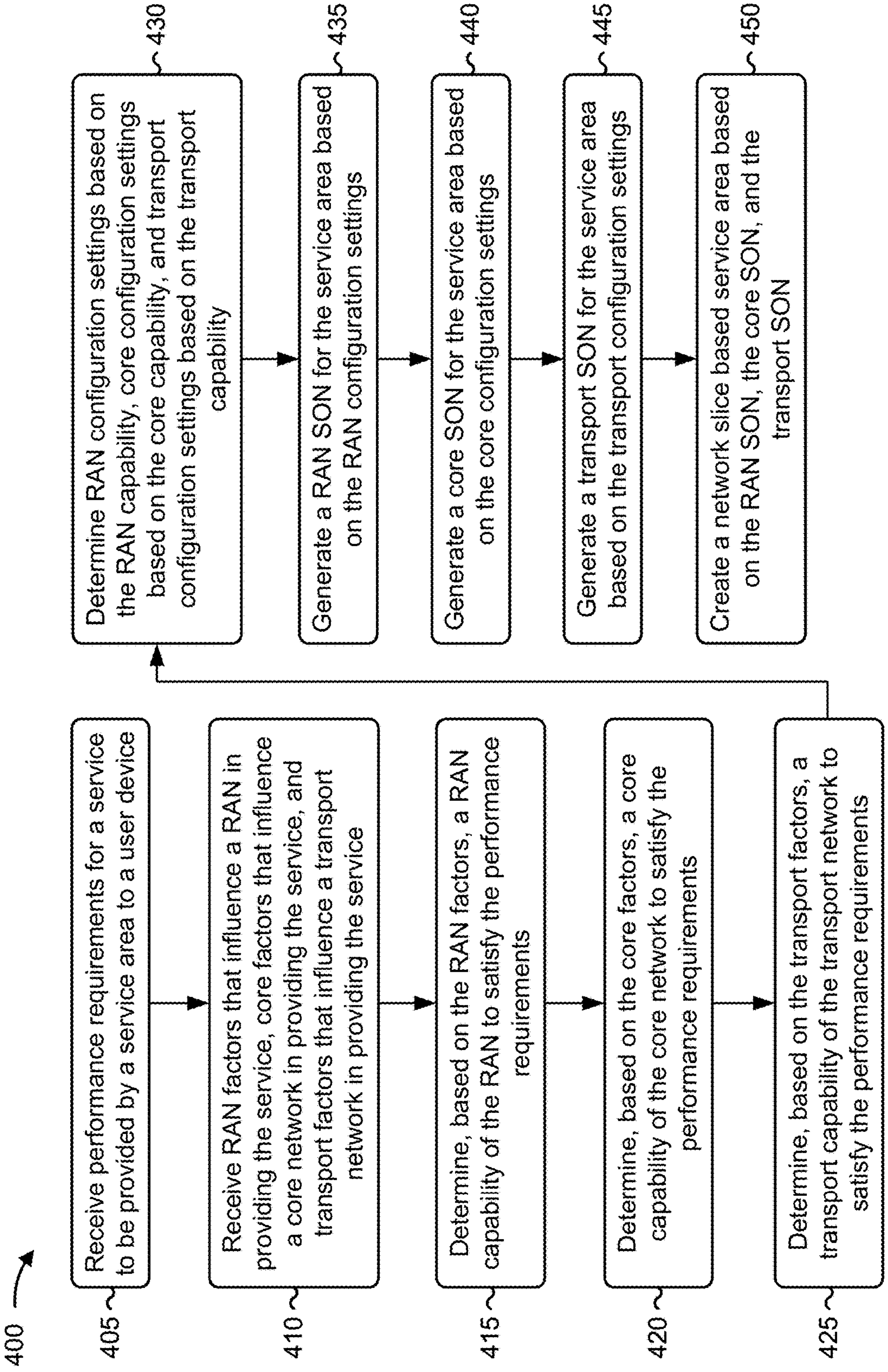
FIG. 4 is a flowchart of an example process for providing a network slice based service area via SONs.

FIG. 4 is a flowchart of an example process 400 for providing a network slice based service area via SONs. In some implementations, one or more process blocks of FIG. 4 may be performed by a device (e.g., the SON system 125). In some implementations, one or more process blocks of FIG. 4 may be performed by another device or a group of devices separate from or including the network device, such as a network device of a core network (e.g., the core network 115). Additionally, or alternatively, one or more process blocks of FIG. 4 may be performed by one or more components of the device 300, such as the processor 320, the memory 330, the input component 340, the output component 350, and/or the communication component 360.

As shown in FIG. 4, process 400 may include receiving performance requirements for a service to be provided by a service area to a user device (block 405). For example, the device may receive performance requirements for a service to be provided by a service area to a user device, as described above. In some implementations, the performance requirements include requirements associated with one or more of an electrical interface, a form factor, a data rate, an optical connection, a fiber type, a wavelength, a distance, a modulation, or a signal-to-noise ratio. In some implementations, the performance requirements are associated with a service level agreement for the service. In some implementations, the performance requirements are associated with traffic characteristics of the service.

As further shown in FIG. 4, process 400 may include receiving RAN factors that influence a RAN in providing the service, core factors that influence a core network in providing the service, and transport factors that influence a transport network in providing the service (block 410). For example, the device may receive RAN factors that influence a RAN in providing the service, core factors that influence a core network in providing the service, and transport factors that influence a transport network in providing the service, as described above. In some implementations, the RAN factors include factors associated with one or more of an electrical interface, a form factor, a data rate, an optical connection, a fiber type, a wavelength, a distance, a modulation, a signal-to-noise ratio, equipment loading, spectrum availability, spectrum loading, or a quality of service identifier.

In some implementations, the core factors include factors associated with one or more of an electrical interface, a form factor, a data rate, an optical connection, a fiber type, a wavelength, a distance, a modulation, a signal-to-noise ratio, equipment loading, spectrum availability, spectrum loading, a user plane function location, a multi-access edge computing device location, an aggregate maximum bit rate, a quality of service identifier, or a guaranteed or non-guaranteed bit rate. In some implementations, the transport factors include factors associated with one or more of an electrical interface, a form factor, a data rate, an optical connection, a fiber type, a wavelength, a distance, a modulation, equipment loading, spectrum availability, or spectrum loading.

In some implementations, receiving the RAN factors that influence the RAN in providing the service, the core factors that influence the core network in providing the service, and the transport factors that influence the transport network in providing the service includes receiving the RAN factors from the RAN, receiving the core factors from the core network, and receiving the transport factors from the transport network.

As further shown in FIG. 4, process 400 may include determining, based on the RAN factors, a RAN capability of the RAN to satisfy the performance requirements (block 415). For example, the device may determine, based on the RAN factors, a RAN capability of the RAN to satisfy the performance requirements, as described above. In some implementations, determining, based on the RAN factors, the RAN capability of the RAN to satisfy the performance requirements includes determining whether one or more of the RAN factors satisfy the performance requirements, and determining the RAN capability based on determining whether one or more of the RAN factors satisfy the performance requirements.

As further shown in FIG. 4, process 400 may include determining, based on the core factors, a core capability of the core network to satisfy the performance requirements (block 420). For example, the device may determine, based on the core factors, a core capability of the core network to satisfy the performance requirements, as described above. In some implementations, determining, based on the core factors, the core capability of the core network to satisfy the performance requirements includes determining whether one or more of the core factors satisfy the performance requirements, and determining the core capability based on determining whether one or more of the core factors satisfy the performance requirements.

As further shown in FIG. 4, process 400 may include determining, based on the transport factors, a transport capability of the transport network to satisfy the performance requirements (block 425). For example, the device may determine, based on the transport factors, a transport capability of the transport network to satisfy the performance requirements, as described above. In some implementations determining, based on the transport factors, the transport capability of the transport network to satisfy the performance requirements includes determining whether one or more of the transport factors satisfy the performance requirements, and determining the transport capability based on determining whether one or more of the transport factors satisfy the performance requirements.

As further shown in FIG. 4, process 400 may include determining RAN configuration settings based on the RAN capability, core configuration settings based on the core capability, and transport configuration settings based on the transport capability (block 430). For example, the device may determine RAN configuration settings based on the RAN capability, core configuration settings based on the core capability, and transport configuration settings based on the transport capability, as described above.

As further shown in FIG. 4, process 400 may include generating a RAN SON for the service area based on the RAN configuration settings (block 435). For example, the device may generate a RAN SON for the service area based on the RAN configuration settings, as described above.

As further shown in FIG. 4, process 400 may include generating a core SON for the service area based on the core configuration settings (block 440). For example, the device may generate a core SON for the service area based on the core configuration settings, as described above.

As further shown in FIG. 4, process 400 may include generating a transport SON for the service area based on the transport configuration settings (block 445). For example, the device may generate a transport SON for the service area based on the transport configuration settings, as described above. In some implementations, the RAN SON, the core SON, and the transport SON are associated with one or more network functions.

As further shown in FIG. 4, process 400 may include creating a network slice based service area based on the RAN SON, the core SON, and the transport SON (block 450). For example, the device may create a network slice based service area based on the RAN SON, the core SON, and the transport SON, as described above.

In some implementations, process 400 includes receiving a request for the service from the user device, and providing the service to the user device via the network slice based service area provided by the RAN SON, the core SON, and the transport SON.

Although FIG. 4 shows example blocks of process 400, in some implementations, process 400 may include additional blocks, fewer blocks, different blocks, or differently arranged blocks than those depicted in FIG. 4. Additionally, or alternatively, two or more of the blocks of process 400 may be performed in parallel.

As used herein, the term "component" is intended to be broadly construed as hardware, firmware, or a combination of hardware and software. It will be apparent that systems and/or methods described herein may be implemented in different forms of hardware, firmware, and/or a combination of hardware and software. The actual specialized control hardware or software code used to implement these systems and/or methods is not limiting of the implementations. Thus, the operation and behavior of the systems and/or methods are described herein without reference to specific software code—it being understood that software and hardware can be used to implement the systems and/or methods based on the description herein.

As used herein, satisfying a threshold may, depending on the context, refer to a value being greater than the threshold, greater than or equal to the threshold, less than the threshold, less than or equal to the threshold, equal to the threshold, not equal to the threshold, or the like.

To the extent the aforementioned implementations collect, store, or employ personal information of individuals, it should be understood that such information shall be used in accordance with all applicable laws concerning protection of personal information. Additionally, the collection, storage, and use of such information can be subject to consent of the individual to such activity, for example, through well known "opt-in" or "opt-out" processes as can be appropriate for the situation and type of information. Storage and use of personal information can be in an appropriately secure manner reflective of the type of information, for example, through various encryption and anonymization techniques for particularly sensitive information.

Even though particular combinations of features are recited in the claims and/or disclosed in the specification, these combinations are not intended to limit the disclosure of various implementations. In fact, many of these features may be combined in ways not specifically recited in the claims and/or disclosed in the specification. Although each dependent claim listed below may directly depend on only one claim, the disclosure of various implementations includes each dependent claim in combination with every other claim in the claim set. As used herein, a phrase referring to "at least one of" a list of items refers to any combination of those items, including single members. As an example, "at least one of: a, b, or c" is intended to cover a, b, c, a-b, a-c, b-c, and a-b-c, as well as any combination with multiple of the same item.

No element, act, or instruction used herein should be construed as critical or essential unless explicitly described as such. Also, as used herein, the articles "a" and "an" are intended to include one or more items and may be used interchangeably with "one or more." Further, as used herein, the article "the" is intended to include one or more items referenced in connection with the article "the" and may be used interchangeably with "the one or more." Furthermore, as used herein, the term "set" is intended to include one or more items (e.g., related items, unrelated items, or a combination of related and unrelated items), and may be used interchangeably with "one or more." Where only one item is intended, the phrase "only one" or similar language is used. Also, as used herein, the terms "has," "have," "having," or the like are intended to be open-ended terms. Further, the phrase "based on" is intended to mean "based, at least in part, on" unless explicitly stated otherwise. Also, as used herein, the term "or" is intended to be inclusive when used in a series and may be used interchangeably with "and/or," unless explicitly stated otherwise (e.g., if used in combination with "either" or "only one of").

In the preceding specification, various example embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:

receiving, by a device, performance requirements for a service to be provided by a service area to a user device;

receiving, by the device, radio access network (RAN) factors that influence a RAN in providing the service, core factors that influence a core network in providing the service, and transport factors that influence a transport network in providing the service;

determining, by the device and based on the RAN factors, whether a RAN capability of the RAN satisfies the performance requirements;

determining, by the device and based on the core factors, whether a core capability of the core network satisfies the performance requirements;

determining, by the device and based on the transport factors, whether a transport capability of the transport network satisfies the performance requirements;

determining, by the device, that one or more of the RAN factors, the core factors, or the transport factors, fail to satisfy the performance requirements;

determining, by the device and using respective best efforts configuration settings for each of the RAN, the core network, and the transport network, RAN configuration settings based on the RAN capability, core configuration settings based on the core capability, and transport configuration settings based on the transport capability, wherein the respective best efforts configuration settings are determined independently for each of the RAN, the core network, and the transport network, and wherein the respective best efforts configuration settings partially satisfy the performance requirements for the one or more of the RAN factors, the core factors, or the transport factors;

generating, by the device, a RAN self-organizing network (SON) for the service area based on the RAN configuration settings;

generating, by the device, a core SON for the service area based on the core configuration settings;

generating, by the device, a transport SON for the service area based on the transport configuration settings; and creating, by the device, a network slice based service area for the service area based on the generated RAN SON, the generated core SON, and the generated transport SON, wherein the network slice based service area partially satisfies the performance requirements for the service.

2. The method of claim 1, further comprising:

receiving a request for the service from the user device; and providing the service to the user device via the network slice based service area provided by the generated RAN SON, the generated core SON, and the generated transport SON.

3. The method of claim 1, wherein the performance requirements include requirements associated with one or more of:

an electrical interface, a form factor, a data rate, an optical connection, a fiber type, a wavelength, a distance, a modulation, or a signal-to-noise ratio.

4. The method of claim 1, wherein the performance requirements are associated with a service level agreement for the service.

5. The method of claim 1, wherein the performance requirements are associated with traffic characteristics of the service.

6. The method of claim 1, wherein determining whether the RAN capability of the RAN satisfies the performance requirements comprises:

determining whether an electrical interface of the RAN satisfies a performance requirement for the electrical interface; or determining whether a form factor of the RAN satisfies a performance requirement for the form factor.

7. The method of claim 1, wherein determining whether the core capability of the core network satisfies the performance requirements comprises:

determining whether an electrical interface of the core network satisfies a performance requirement for the electrical interface; or determining whether a form factor of the core network satisfies a performance requirement for the form factor.

8. A device, comprising:

one or more processors configured to:

receive performance requirements for a service to be provided by a service area to a user device;

receive radio access network (RAN) factors that influence a RAN in providing the service, core factors that influence a core network in providing the service, and transport factors that influence a transport network in providing the service;

determine, based on the RAN factors, whether a RAN capability of the RAN satisfies the performance requirements;

determine, based on the core factors, whether a core capability of the core network satisfies the performance requirements;

determine, based on the transport factors, whether a transport capability of the transport network satisfies the performance requirements;

determine that one or more of the RAN factors, the core factors, or the transport factors, fail to satisfy the performance requirements;

determine, using respective best efforts configuration settings for each of the RAN, the core network, and the transport network, RAN configuration settings based on the RAN capability, core configuration settings based on the core capability, and transport configuration settings based on the transport capability, wherein the respective best efforts configuration settings are determined independently for each of the RAN, the core network, and the transport network, and wherein the respective best efforts configuration settings partially satisfy the performance requirements for the one or more of the RAN factors, the core factors, or the transport factors;

generate a RAN self-organizing network (SON) for the service area based on the RAN configuration settings;

generate a core SON for the service area based on the core configuration settings;

generate a transport SON for the service area based on the transport configuration settings;

create a network slice based service area for the service area based on the generated RAN SON, the generated core SON, and the generated transport SON, wherein the network slice based service area partially satisfies the performance requirements for the service;

receive a request for the service from the user device; and provide the service to the user device via the network slice based service area.

9. The device of claim 8, wherein determining whether the transport capability of the transport network satisfies the performance requirements comprises:

determining whether an electrical interface of the transport network satisfies a performance requirement for the electrical interface; or determining whether a form factor of the transport network satisfies a performance requirement for the form factor.

10. The device of claim 8, wherein the one or more processors, to receive the RAN factors that influence the RAN in providing the service, the core factors that influence the core network in providing the service, and the transport factors that influence the transport network in providing the service, are configured to:

receive the RAN factors from the RAN;

receive the core factors from the core network; and receive the transport factors from the transport network.

11. The device of claim 8, wherein the generated RAN SON, the generated core SON, and the generated transport SON are associated with one or more network functions.

12. The device of claim 8, wherein the one or more processors, to determine, based on the RAN factors, whether the RAN capability of the RAN satisfies the performance requirements, are configured to:

determine whether one or more of the RAN factors satisfy the performance requirements; and determine the RAN capability based on determining whether one or more of the RAN factors satisfy the performance requirements.

13. The device of claim 8, wherein the one or more processors, to determine, based on the core factors, whether the core capability of the core network satisfies the performance requirements, are configured to:

determine whether one or more of the core factors satisfy the performance requirements; and determine the core capability based on determining whether one or more of the core factors satisfy the performance requirements.

14. The device of claim 8, wherein the one or more processors, to determine, based on the transport factors, whether the transport capability of the transport network satisfies the performance requirements, are configured to:

determine whether one or more of the transport factors satisfy the performance requirements; and determine the transport capability based on determining whether one or more of the transport factors satisfy the performance requirements.

15. A non-transitory computer-readable medium storing a set of instructions, the set of instructions comprising:

one or more instructions that, when executed by one or more processors of a device, cause the device to:

receive performance requirements for a service to be provided by a service area to a user device;

receive radio access network (RAN) factors that influence a RAN in providing the service, core factors that influence a core network in providing the service, and transport factors that influence a transport network in providing the service;

determine, based on the RAN factors, whether a RAN capability of the RAN satisfies the performance requirements;

determine, based on the core factors, whether a core capability of the core network satisfies the performance requirements;

determine, based on the transport factors, whether a transport capability of the transport network satisfies the performance requirements;

determine, by the device, that one or more of the RAN factors, the core factors, or the transport factors, fail to satisfy the performance requirements;

determine, using respective best efforts configuration settings for each of the RAN, the core network, and the transport network, RAN configuration settings based on the RAN capability, core configuration settings based on the core capability, and transport configuration settings based on the transport capability, wherein the respective best efforts configuration settings are determined independently for each of the RAN, the core network, and the transport network, and wherein the respective best efforts configuration settings partially satisfy the performance requirements for the one or more of the RAN factors, the core factors, or the transport factors;

generate a RAN self-organizing network (SON) for the service area based on the RAN configuration settings;

generate a core SON for the service area based on the core configuration settings;

generate a transport SON for the service area based on the transport configuration settings;

create a network slice based service area for the service area based on the generated RAN SON, the generated core SON, and the generated transport SON, wherein the network slice based service area partially satisfies the performance requirements for the service;

receive a request for the service from the user device; and provide the service to the user device via the network slice based service area.

16. The non-transitory computer-readable medium of claim 15, wherein the performance requirements are associated with a service level agreement for the service and with traffic characteristics of the service.

17. The non-transitory computer-readable medium of claim 15, wherein the one or more instructions, that cause the device to receive the RAN factors that influence the RAN in providing the service, the core factors that influence the core network in providing the service, and the transport factors that influence the transport network in providing the service, cause the device to:

receive the RAN factors from the RAN;

receive the core factors from the core network; and receive the transport factors from the transport network.

18. The non-transitory computer-readable medium of claim 15, wherein the one or more instructions, that cause the device to determine, based on the RAN factors, whether the RAN capability of the RAN satisfies the performance requirements, cause the device to:

determine whether one or more of the RAN factors satisfy the performance requirements; and determine the RAN capability based on determining whether one or more of the RAN factors satisfy the performance requirements.

19. The non-transitory computer-readable medium of claim 15, wherein the one or more instructions, that cause the device to determine, based on the core factors, whether the core capability of the core network satisfies the performance requirements, cause the device to:

determine whether one or more of the core factors satisfy the performance requirements; and determine the core capability based on determining whether one or more of the core factors satisfy the performance requirements.

20. The non-transitory computer-readable medium of claim 15, wherein the one or more instructions, that cause the device to determine, based on the transport factors, whether the transport capability of the transport network satisfies the performance requirements, cause the device to:

determine whether one or more of the transport factors satisfy the performance requirements; and determine the transport capability based on determining whether one or more of the transport factors satisfy the performance requirements.

* * * * *